United States Patent
Karuppiah et al.

(10) Patent No.: US 11,271,898 B2
(45) Date of Patent: Mar. 8, 2022

(54) HASH COLLISION PREVENTION SYSTEM

(71) Applicant: Dell Products L.P., Round Rock, TX (US)

(72) Inventors: Kannan Karuppiah, Santa Clara, CA (US); Udhaya Chandran Shanmugam, Santa Clara, CA (US)

(73) Assignee: Dell Products L.P., Round Rock, TX (US)

( * ) Notice: Subject to any disclaimer, the term of this patent is extended or adjusted under 35 U.S.C. 154(b) by 117 days.

(21) Appl. No.: 16/752,893

(22) Filed: Jan. 27, 2020

(65) Prior Publication Data

US 2021/0234831 A1   Jul. 29, 2021

(51) Int. Cl.
| | |
|---|---|
| *H04L 29/08* | (2006.01) |
| *H04L 61/2503* | (2022.01) |
| *H04L 61/5014* | (2022.01) |
| *H04L 45/7453* | (2022.01) |
| *H04L 41/08* | (2022.01) |
| *H04L 9/32* | (2006.01) |
| *H04L 101/686* | (2022.01) |

(52) U.S. Cl.
CPC ........ *H04L 61/2503* (2013.01); *H04L 9/3236* (2013.01); *H04L 41/0886* (2013.01); *H04L 45/7453* (2013.01); *H04L 61/2015* (2013.01); *H04L 61/6086* (2013.01)

(58) Field of Classification Search
CPC ............. H04L 61/2503; H04L 45/7453; H04L 9/3236; H04L 61/6086; H04L 61/2015; H04L 41/0886
See application file for complete search history.

(56) References Cited

U.S. PATENT DOCUMENTS

| | | | |
|---|---|---|---|
| 2004/0052216 A1* | 3/2004 | Roh | H04L 29/12584 370/252 |
| 2006/0047788 A1* | 3/2006 | Sakai | H04L 61/2015 709/220 |
| 2010/0058027 A1* | 3/2010 | Gong | G06F 16/325 711/216 |
| 2018/0097631 A1* | 4/2018 | Uppal | H04L 61/6004 |
| 2018/0205652 A1* | 7/2018 | Saxena | H04L 61/2557 |
| 2020/0097174 A1* | 3/2020 | Moore | G06F 3/0604 |
| 2020/0280511 A1* | 9/2020 | Gapin | H04L 67/141 |

* cited by examiner

*Primary Examiner* — Lan-Huong Truong (74) *Attorney, Agent, or Firm* — Joseph Mencher (57) ABSTRACT

A hash collision prevention system includes a plurality of host devices and a plurality of networking devices. A host device address generation system retrieves network addressing information associated with the plurality of host devices, and identifies a hashing function utilized by the plurality of networking devices in transmitting data packets associated with the plurality of host devices. The host device address generation system then uses the hashing function and the network addressing information to determine a plurality of host device addresses that do not produce a hash collision, and provides the plurality of host device addresses for provisioning to the plurality of host devices.

20 Claims, 4 Drawing Sheets

HASH COLLISION PREVENTION SYSTEM

BACKGROUND

The present disclosure relates generally to information handling systems, and more particularly to preventing hash collisions in a hash forwarding table utilized by networking information handling systems As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, switch devices and/or other networking devices known in the art, often utilize forwarding tables for forwarding data packets from source devices to destination devices. In some situations, the forwarding tables include hash tables that utilize hash values generated from received data packets via a hashing function and/or hashing algorithm operating on information in one or more fields from the packet (referred to as the "hash key"), with those hash values associated in the hash tables with forwarding information that may be utilized to forward subsequent data packets that generate matching hash values via hash operations performed using the same hashing function. However, as would be understood by one of skill in the art in possession of the present disclosure, hashing functions utilized to perform hash operations on data packets received by the switch device can occasionally result in a hash collision in which the performance of the hash operation using the hashing function on different data packets (e.g., sent from different devices) provides the same hash value, a scenario that becomes more likely as the hash forwarding table approaches capacity.

For example, forwarding tables for providing forwarding using 32-bit Internet Protocol version 4 (IPv4) addresses and 128-bit Internet Protocol version 6 (IPv6) addresses are commonly implemented using hash tables, with 32-bit IPv4 addresses and 128-bit IPv6 addresses commonly used for Address Resolution Protocol (ARP) entries, Neighbor Discovery Protocol (NDP) entries, host route entries, and anycast address entries. In the event that a hash collision occurs when attempting to add an IP address to forwarding table entry, that IP address cannot be added as an entry to the hash forwarding table, and may result in inefficient operations by the switch device. For example, a hash collision may result in the switch device utilizing software techniques to perform forwarding, as software may be unable to program resolved ARP entries and/or NDP entries in hardware, but the use of software requires valuable processing resources that could otherwise be utilized for other functionality. As will be appreciated by one of skill in the art, such hash collision issues will persist until the forwarding table entry that matches the hash value that caused the hash collision is no longer needed and, as such, hash collision issues typically do not get resolved on their own.

One conventional solution to address hash collisions is to provide for a plurality of entries for any particular hash value forwarding entry in the hash forwarding table (e.g., n buckets for each hash value forwarding entry, n simultaneous hash polynomials, etc.) However, such solutions must still deal with the fact that (n+1) hash collisions are always possible and can result in a hash collision in which a hash value generated for the key cannot be added as an entry to the hash table. Furthermore, Application Specific Integrated Circuit (ASIC) solutions may be employed that include switching a Cyclic Redundancy Check (CRC) mechanism (e.g., between CRC-16 and CRC-32), modifying bits used from the hashing function/hash operation, modifying the hash polynomial, or changing the IP address(es) that resulted in the hash collision, each of which one of skill in the art will recognize is reactive and relatively disruptive to the normal operation of the switch device. Furthermore, U.S. patent application Ser. No. 16/523,838 filed on Jul. 26, 2019 (which includes one of the inventors of the present disclosure) describes techniques for utilizing a Ternary Content Addressable Memory (TCAM) with Policy Based Routing (PBR) entries in order to mitigate the effects of hash collisions, but the use of the TCAM (or a Algorithmic Longest Prefix Match (ALPM) table) to address hash collisions requires the occupation of their limited available storage space that is often shared by multiple subsystems in the switch device.

Accordingly, it would be desirable to provide an improved solution to problems associated with hash collisions that conventionally occur when adding entries to a hash table in a packet routing system.

SUMMARY

According to one embodiment, an Information Handling System (IHS) includes a processing system; and a memory system that is coupled to the processing system and that includes instructions that, when executed by the processing system, cause the processing system to provide a host device address generation engine that is configured to: retrieve network addressing information utilized by a plurality of host devices; identify a hashing function utilized by a plurality of networking devices in transmitting data packets associated with the plurality of host devices; determine, using the hashing function and the network addressing information, a plurality of host device addresses that do not produce a hash collision; and provide the plurality of host device addresses for provisioning to the plurality of host devices.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
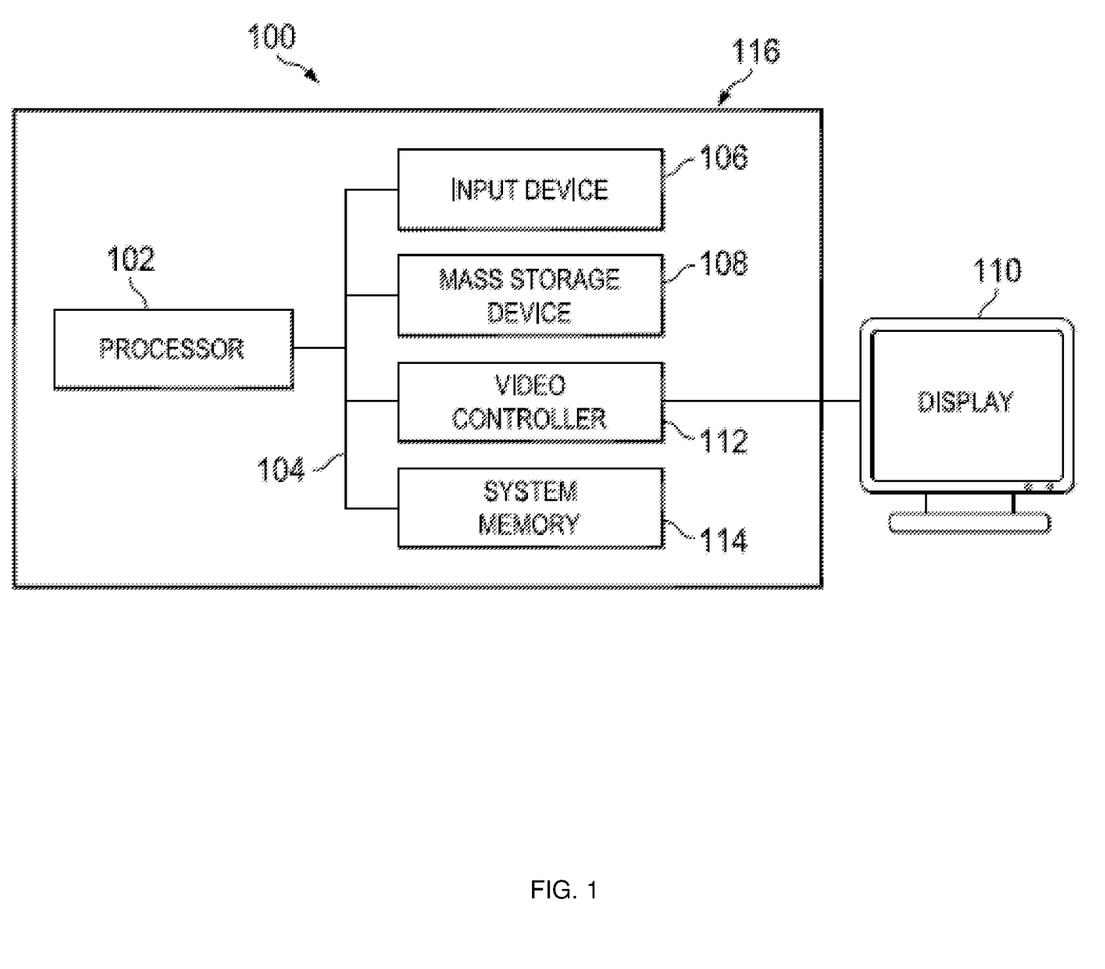
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
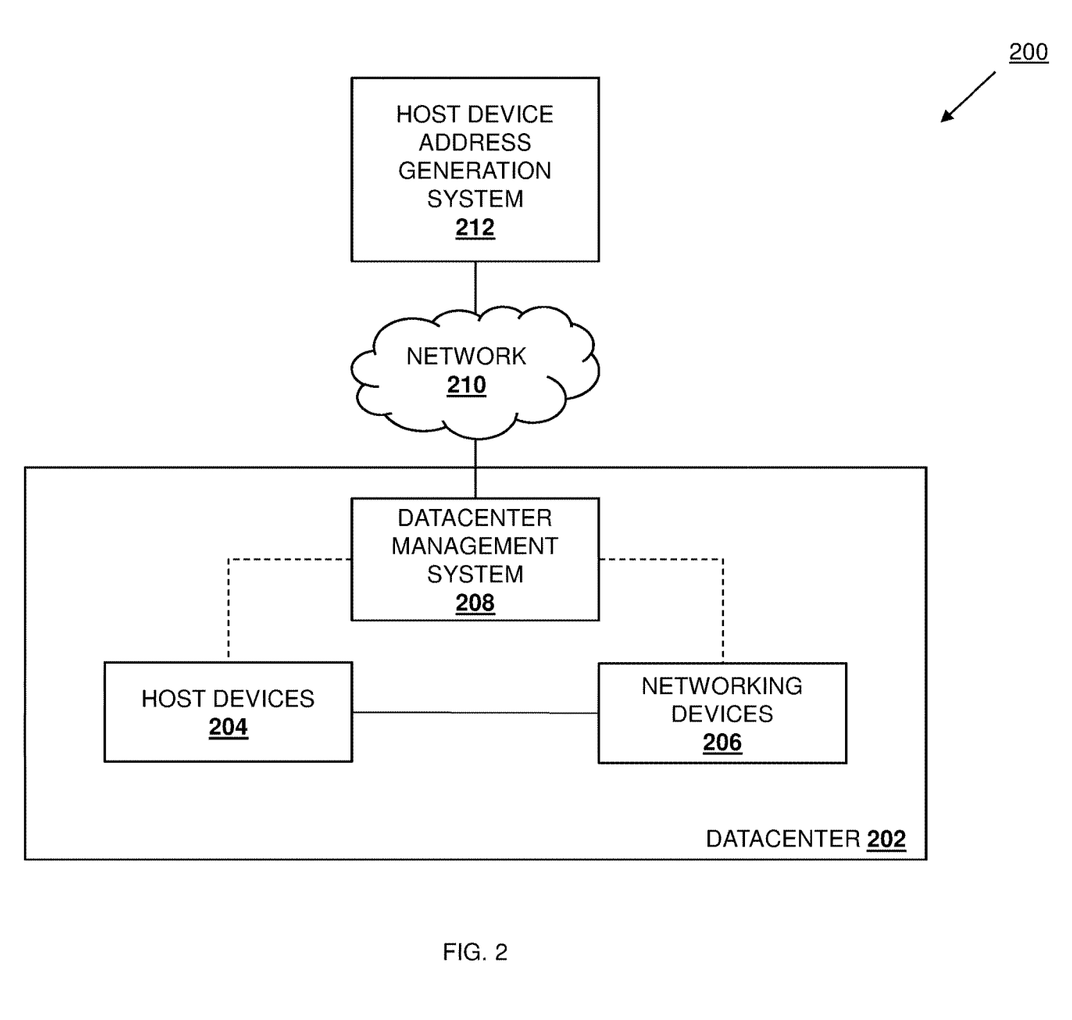
FIG. 2 is a schematic view illustrating an embodiment of hash collision prevention system.

Referring now to FIG. 2, an embodiment of a hash collision prevention system 200 is illustrated. In the illustrated embodiment discussed below, the hash collision prevention system 200 is provided in a datacenter 202 including a plurality of host devices 204, although one of skill in the art in possession of the present disclosure will appreciate that the hash collision prevention system of the present disclosure may be provided in a variety of manners that do not involve datacenters while remaining within the scope of the present disclosure as well. In an embodiment, any or all the host devices 202 may be provided by the IHS 100 discussed above with reference to FIG. 1, and/or may include some or all of the components of the IHS 100, and in specific examples, may be provided by server devices. However, while illustrated and discussed as being provided by server devices, one of skill in the art in possession of the present disclosure will recognize that host devices provided in the hash collision prevention system 200 may include any computing devices that may be configured to operate similarly as the host devices 204 discussed below.

In the illustrated embodiment, the datacenter 202 in the hash collision prevention system 200 also includes a plurality of networking devices 206 that are coupled to the host devices 202 and that may be configured to transmit data packets to, from, and/or between the host devices 204, as well as perform a variety of other networking device functionality that would be apparent to one of skill in the art in possession of the present disclosure. In an embodiment, any or all the networking devices 202 may be provided by the IHS 100 discussed above with reference to FIG. 1, and/or may include some or all of the components of the IHS 100, and in specific examples, may be provided by switch devices. However, while illustrated and discussed as being provided by switch devices, one of skill in the art in possession of the present disclosure will recognize that networking devices provided in the hash collision prevention system 200 may include any computing devices that may be configured to operate similarly as the networking devices 206 discussed below.

In the illustrated embodiment, the datacenter 202 in the hash collision prevention system 200 also includes a datacenter management system 208 that may be coupled to the host devices 202 and networking devices 206 (although the dashed lines in FIG. 2 indicate that such a coupling is optional.) In an embodiment, the datacenter management system 208 may be provided by the IHS 100 discussed above with reference to FIG. 1, and/or may include some or all of the components of the IHS 100, and in specific examples, may be provided by a one or more server devices, a desktop computing device, a laptop/notebook computing device, a tablet computing device, a mobile phone, and/or other management computing devices that would be apparent to one of skill in the art in possession of the present disclosure. For example, as discussed below, the datacenter management system 208 may include management laptop/notebook devices utilized by network administrators and/or other users of the datacenter 202, Dynamic Host Configuration Protocol (DHCP) server devices that operate according to the DHCP protocol to dynamically assign Internet Protocol addresses and other networking parameters to the host devices 204 in order to configure those host devices for communication, and/or any other datacenter management subsystems that would be apparent to one of skill in the art in possession of the present disclosure. However, while illustrated and discussed as being provided by particular computing devices, one of skill in the art in possession of the present disclosure will recognize that datacenter management systems provided in the hash collision prevention system 200 may include any computing devices that may be configured to operate similarly as the datacenter management system 208 discussed below.

In the illustrated embodiment, the hash collision prevention system 200 also includes a host device address generation system 212 that is coupled to the datacenter management system 208 in the datacenter 202 via a network 210 that may be provided by a Local Area Network (LAN), the Internet, combinations thereof, and/or other networks that would be apparent to one of skill in the art in possession of the present disclosure. In an embodiment, the host device address generation system 212 may be provided by the IHS 100 discussed above with reference to FIG. 1, and/or may include some or all of the components of the IHS 100, and in specific examples, may be provided by one or more server devices. For example, the host device address generation system 212 may be part of the DELL® Fabric Design Center (FDC) provided by DELL® Inc. of Round Rock, Tex., United States, which one of skill in the art in possession of the present disclosure will recognize may provide for network-based centralized design, configuration, and management of datacenter components, as well as a variety of other functionality known in the art. However, while illustrated and discussed as being provided by server device(s), one of skill in the art in possession of the present disclosure will recognize that host device address generation systems provided in the hash collision prevention system 200 may include any computing devices that may be configured to operate similarly as the host device address generation system 212 discussed below. Furthermore, while a specific hash collision prevention system 200 has been illustrated and described, one of skill in the art in possession of the present disclosure will recognize that the hash collision prevention system of the present disclosure may include a variety of components and component configurations while remaining within the scope of the present disclosure as well.

Figure 3:
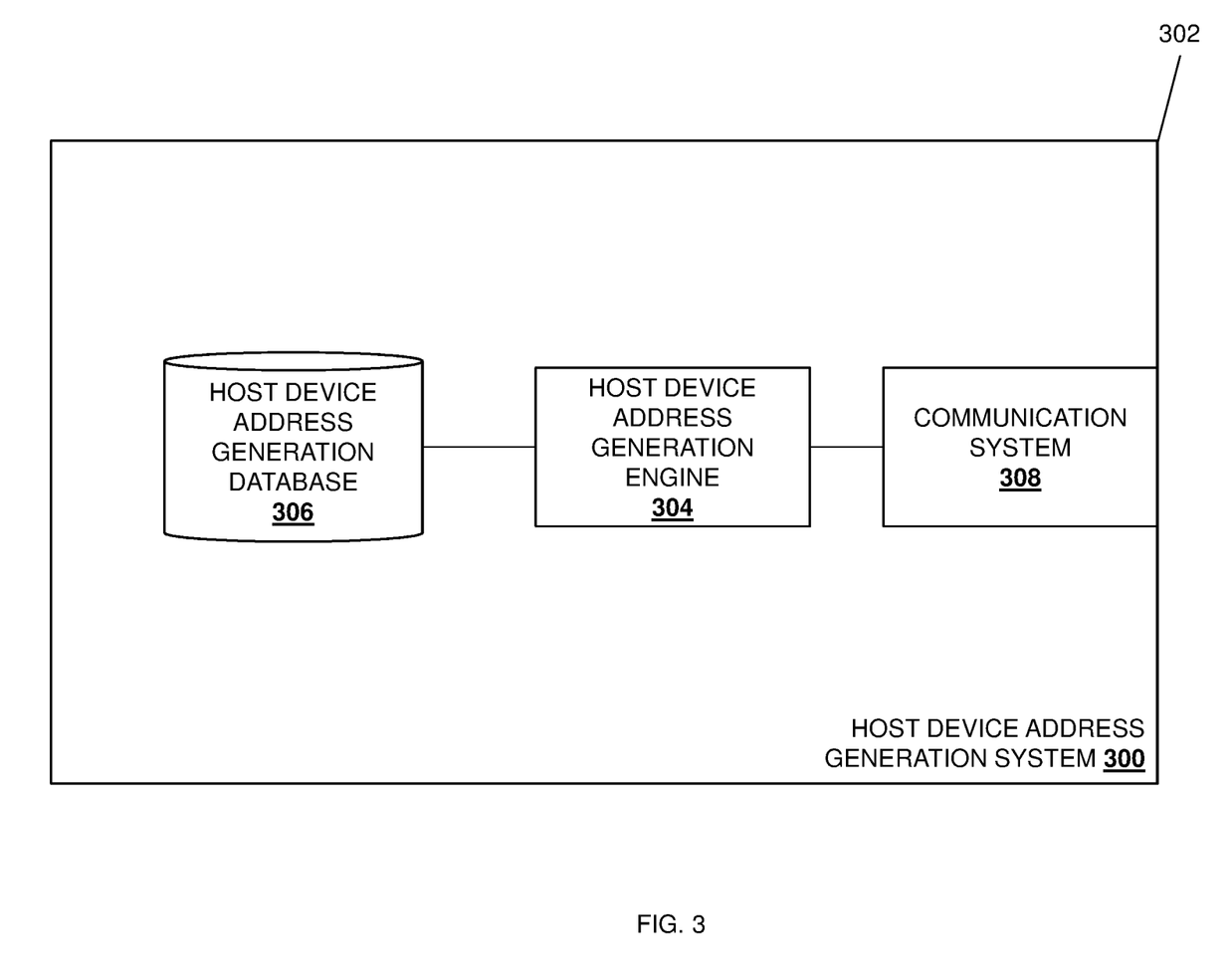
FIG. 3 is a schematic view illustrating an embodiment of a host device address generation system that may be provided in the hash collision prevention system of FIG. 2.

Referring now to FIG. 3, an embodiment of a host device address generation system 300 is illustrated that may provide the host device address generation system 212 discussed above with reference to FIG. 2. As such, the host device address generation system 300 may be provided by the IHS 100 discussed above with reference to FIG. 1 and/or may include some or all of the components of the IHS 100, and in specific examples may be provided by one or more server devices that may be included in the DELL® Fabric Design Center (FDC) provided by DELL® Inc. of Round Rock, Tex., United States. Furthermore, while illustrated and discussed as provided by one or more server devices, one of skill in the art in possession of the present disclosure will recognize that the functionality of the host device address generation system 300 discussed below may be provided by other computing devices that are configured to operate similarly as the host device address generation system 300 discussed below. In the illustrated embodiment, the host device address generation system 300 includes a chassis 302 that houses the components of the host device address generation system 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a host device address generation engine 304 that is configured to perform the functionality of the host device address generation engines and/or host device address generation systems discussed below.

The chassis 302 may also house a storage system (not illustrated, but which may include the storage 108 discussed above with reference to FIG. 1) that is coupled to the host device address generation engine 304 (e.g., via a coupling between the storage system and the processing system) and that may include a host device address generation database 306 that may store any of the information utilized by the host device address generation engine 304 discussed below. The chassis 302 may also house a communication system 308 that is coupled to the switch engine 304 (e.g., via a coupling between the communication system 310 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific host device address generation system 300 has been illustrated, one of skill in the art in possession of the present disclosure will recognize that host device address generation systems (or other devices operating according to the teachings of the present disclosure in a manner similar to that described below for the host device address generation system 300) may include a variety of components and/or component configurations for providing conventional host device address generation functionality, as well as the functionality discussed below, while remaining within the scope of the present disclosure as well.

Figure 4:
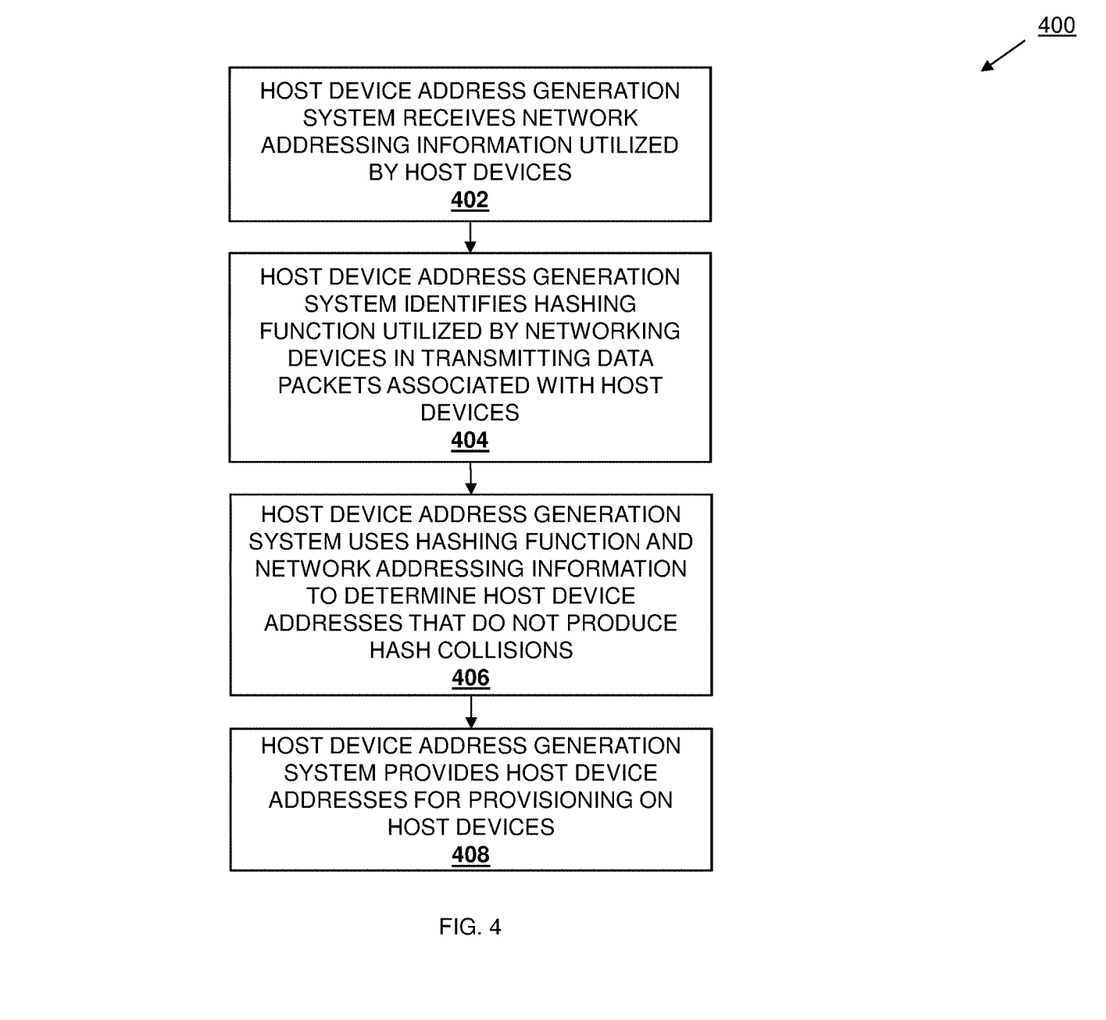
FIG. 4 is a flow chart illustrating an embodiment of a method for preventing hash collisions.

Referring now to FIG. 4, an embodiment of a method 400 for preventing hash collisions is illustrated. As discussed below, the systems and methods of the present disclosure provide for the proactive prevention of hash collisions by determining host device addresses that will not result in hash collisions prior to assigning those host device addresses to host devices, and then subsequently assigning only those host device addresses to the host devices. For example, a host device address generation system may retrieve network addressing information associated with the host devices such as an Internet Protocol (IP) address base that will be utilized by each of the host devices, and at least one subnet mask that will be utilized by each of the host devices. The host device address generation system may then identify a hashing function utilized by networking devices in transmitting data packets associated with the host devices, and use the hashing function and the network addressing information to determine a plurality of host device addresses that do not produce a hash collision. The host device address generation system may then provide the plurality of host device addresses for provisioning to the host devices, which ensures that the networking devices will not generate hash values from data packets received from those host devices that produce hash collisions (i.e., in networking device forwarding tables utilized by the networking devices.)

The method 400 begins at block 402 where a host device address generation system receives network addressing information utilized by host devices. In an embodiment, at block 402, a network administrator or other user associated with the datacenter 202 may utilize the datacenter management system 208 to perform configuration operations to configure the datacenter 202 for operation and, as part of those configuration operations may communicate with the host device address generation system 212 (e.g., as part of the DELL® FDC discussed above) in order to determine details about the host devices 204 and/or the networking devices 206 that will provide the datacenter 202. For example, one of skill in the art in possession of the present disclosure will appreciate that configuration operations associated with fabric design systems such as the DELL® FDC discussed above may include the fabric design system receiving datacenter information from the datacenter management system 208 that details the needs, functionality, design, and/or desired operation of the datacenter 202. The fabric design system may then utilize the datacenter information to generate a datacenter configuration that may identify the host devices, networking devices, and/or other datacenter components that will satisfy those datacenter needs, functionality, design, and/or desired operation. As such, in a specific example, the host device address generation system 212 (or fabric design systems of which the host device address generation system 212 is a part of) may utilize any datacenter information received at block 402 in order to recommend supported networking device platforms (e.g., by recommending leaf switch devices, spine switch devices, Top of Rack (ToR) switch devices, etc.) that may be utilized to provide the networking devices 206 that will enable a desired connectivity between the host devices 204, determine at least one configuration detail for at least one of those networking devices 206, and provide the at least one configuration detail for provisioning on the at least one of those networking devices 206, as well as perform any other conventional datacenter configuration operations that would be apparent to one of skill in the art in possession of the present disclosure.

In addition to any conventional datacenter configuration operations, at block 402 the host device address generation engine 304 in the host device address generation system 212 may receive network addressing information utilized by the host devices 204 via its communication system 308. For example, as part of the collection of datacenter information at block 402 for use in generating the datacenter configuration discussed above, the host device address generation system 212 may be configured to request (e.g., via a web-based configuration information request screen provided via a website), and the datacenter management system 208 may be configured to provide (e.g., via the network 210), network addressing information that will be utilized by the host devices 204 during the subsequent operation of the datacenter 202. For example, a network administrator or other user of the datacenter 202 may utilize the web-based configuration information request screen provided via the website discussed above by the host device address generation system 212 in order to input and transmit network addressing information that will be subsequently utilized by the host devices 204 in the datacenter 202 to the host device address generation engine 304 in the host device address generation system 212. For example, the network addressing information provided to the host device address generation engine 304 at block 402 may include an IP address base (e.g., "10.1.1.1"), at least one subnet mask (e.g., "/16" or "255.255.0.0"), and/or any other network addressing information that would be apparent to one of skill in the art in possession of the present disclosure.

Furthermore, in some examples, the network administrator or other user of the datacenter 202 may utilize the web-based configuration information request screen provided via the website discussed above by the host device address generation system 212 in order to input and transmit a number of host devices 204 that will be provided in the datacenter 202 (e.g., "10,000") to the host device address generation engine 304 in the host device address generation system 212. However, in other examples, the host device address generation engine 304 in the host device address generation system 212 may be configured to identify the number of host devices 204 that will be provided in the datacenter 202 using other techniques (e.g., based on a recommendation made by the fabric design systems) while remaining with the scope of the present disclosure as well. In a specific example, for each subnet mask included in the network addressing information discussed above, a number of host devices in each subset identified by the subnet mask(s) may be identified by the host device address generation engine 304 at block 404. Furthermore, while a few specific examples have been provided, one of skill in the art in possession of the present disclosure will appreciate that other network addressing information and/or other information may be received, identified, and/or otherwise utilized by the host device address generation engine 304 in the host device address generation system 212 in order to provide the functionality discussed below while remaining within the scope of the present disclosure as well.

The method 400 then proceeds to block 404 where the host device address generation system identifies a hashing function utilized by networking devices in transmitting data packets associated with the host devices. In an embodiment, at block 404, the host device address generation engine 304 in the host device address generation system 212 may identify hashing function(s) that will be utilized by the networking devices 206 during the subsequent operation of the datacenter 202. As discussed above, during operation of the datacenter 202, the networking devices 206 included in the datacenter 202 may operate to utilize one or more hashing functions (e.g., the Secure Hash Algorithm 256 (SHA-256) and/or other hashing functions that would be apparent to one of skill in the art in possession of the present disclosure) to generate hash values from initial data packets received from any of the host devices 204, and use those hash values to provide packet forwarding information in their forwarding tables.

As such, at block 404, the host device address generation engine 304 in the host device address generation system 212 may identify any hashing function(s) that will be utilized by the networking devices 206 during the subsequent operation of the datacenter 202 by retrieving the identity of the hashing function(s) via its communication system 308 and over the network 210 from the networking devices 206, receiving the identity of the hashing function(s) via its communication system 308 and over the network 210 from the a network administrator or other user of the datacenter 202 (e.g., via the web-based configuration information request screen provided via the website discussed above by the host device address generation system 212), determining the identity of the hashing function(s) based on the networking device recommendations discussed above, and/or utilizing any other hashing function identification technique that would be apparent to one of skill in the art in possession of the present disclosure.

The method 400 then proceeds to block 406 where the host device address generation system uses the hashing function and the network addressing information to determine host device addresses that do not produce hash collisions. In an embodiment, at block 406, the host device address generation engine 304 in the host device address generation system 212 may utilize the network addressing information received at block 402 and the hashing function(s) identified at block 404 in order to determine host device addresses that do not produce hash collisions. As would be appreciated by one of skill in the art in possession of the present disclosure, a hashing function may be utilized to perform a hashing operation on any arbitrary sized data in order to map that data to fixed sized data. As such, at block 406, the host device address generation engine 304 in the host device address generation system 212 may utilize the IP address base (e.g., "10.1.1.1"), the one or more subnet masks (e.g., "/16" or "255.255.0.0"), and any other network addressing information, in order to generate a plurality of different inputs to the hashing function(s) identified at block 404 in order to generate respective hash values from those inputs.

As such, in a specific example, the host device address generation engine 304 in the host device address generation system 212 may utilize the IP address base, the one or more subnet masks, and any other network addressing information discussed above in order to generate first host device packet information, and provide that first host packet information as an input to a hashing function identified at block 404 in order to produce a first hash value. The host device address generation engine 304 in the host device address generation system 212 may then utilize the IP address base, the one or more subnet masks, and any other network addressing information discussed above in order to generate second host device packet information, and provide that second host packet information as an input to a hashing function identified at block 404 in order to produce a second hash value. As will be appreciated by one of skill in the art in possession of the present disclosure, the host device address generation engine 304 in the host device address generation system 212 may utilize the IP address base, the one or more subnet masks, and any other network addressing information discussed above to generate any possible host device packet information (e.g., source IP addresses, subnet masks, and/or other network addressing information that will be utilized by host devices in the datacenter 202 to transmit data packets), and then provide that host device packet information that has been generated as inputs to the hashing function(s) to produce its corresponding hash value. Thus, block 406 may result in the host device address generation engine 304 in the host device address generation system 212 producing a corresponding hash value associated with any possible host device packet information that may be generated from the network addressing information available to the host devices 204 in the datacenter 202 and, in particular, a respective hash value for any number of source IP addresses that correspond to the IP address base. As discussed below, the number of host device 204 that will be utilized in the datacenter 202 may be considered by the host device address generation engine 304 to limit the number of hash values that are produced at block 406.

In a specific simplified example, the forwarding tables utilized by the networking devices 206 may include 100 entries that are divided into 10 buckets of 10 entries each, and each bucket may be associated with a hash value index (e.g., a hash value index of "1" for the first bucket, a hash value index of "2" for the second bucket, and up to a hash value index of "10" for the tenth bucket.) As will be appreciated by one of skill in the art in possession of the present disclosure, a forwarding table hashing algorithm that utilizes the hashing function discussed above may provide any hash value produced by the hashing function as an integer that corresponds to one of the hash value indices (e.g., 1-10), and any particular hash value index may be utilized to provide the corresponding IP address that was used as an input to the hashing function in the bucket associated with that hash value index. As such, continuing with the example provided above, a first IP address may produce a hash value index of "1" via the hashing algorithm and thus be provided in the first bucket, a second IP address may produce a hash value index of "2" via the hashing algorithm and thus be provided in the second bucket, and so on. However, as discussed above, each of the buckets in the forwarding tables may be limited to 10 entries each, and any IP addresses that produces a hash value index corresponding to a bucket that already holds 10 IP addresses in its available 10 entries will result in a hash collision.

Thus, at block 406, the host device address generation engine 304 in the host device address generation system 212 may then determine host device addresses that do not produce hash collisions by identifying, for each bucket in the forwarding tables associated with a corresponding hash value index, host device packet information that includes IP addresses that utilize available entries in those buckets (e.g., each the 10 entries available in each bucket in the example above), as well as host device packet information that includes IP addresses that would require unavailable entries in those buckets. For example, for different host device packet information provided as inputs to a hashing function that produces the same hash value index corresponding to a particular bucket in the forwarding tables, the source IP addresses included in that host device packet information that utilize available entries in that particular bucket (e.g., the first 10 entries in that particular bucket) may be determined to not cause a hash collision, while the source IP addresses included in that host device packet information that would require unavailable entries in that particular bucket (e.g., any source IP addresses following the first 10 source IP addresses that utilize available entries in that particular bucket in the example above) may be determined to cause a hash collision. As such, the available entries in each bucket available in the forwarding tables may be filled with source IP addresses that produce the hash value index corresponding to those buckets, with any other source IP addresses that produce the hash value index for a bucket after it has already been filled with source IP addresses will be determined to cause a hash collision.

Thus, in some embodiments of block 406, the host device address generation engine 304 in the host device address generation system 212 may identify a plurality of source IP addresses that utilize available entries in the buckets provided in the forwarding tables. Furthermore, such source IP addresses that do not cause hash collisions may be determined for each subnet associated with the subnet mask(s) received at block 402, and selected for subsequent use by the host devices 204 in the datacenter 202. As will be appreciated by one of skill in the art in possession of the present disclosure, the number of host devices 204 in the datacenter 202 (which may be determined or identified as discussed above) may be used to limit the number of the source IP addresses determined at block 406 (i.e., to the number of host devices 204 that will be used in the datacenter 202), which allows the host device address generation engine 304 in the host device address generation system 212 to only determine a number of source IP addresses (which do not result in hash collisions) that is equal to the number of host devices 204 in the datacenter 204. Furthermore, one of skill in the art in possession of the present disclosure will recognize that, in the event the host devices 204 in the datacenter 202 will utilize both Internet Protocol (IP) version 4 (IPv4) addresses and IP version 6 (IPv6) addresses, the operations performed at block 406 by the host device address generation engine 304 in the host device address generation system 212 may include the identification of both IPv4 source addresses and IPv6 source addresses that do not produce hash collisions as well. Finally, in the event the use of a first hashing function with the IP address base and subnet mask(s) produces a number of source IP addresses (which do not result in hash collisions) that is less than the number of host devices 204 in the datacenter 202, the host device address generation engine 304 in the host device address generation system 212 may utilize different hashing function(s) with the IP address base and subnet mask(s) in order to produce a number of source IP addresses (which do not result in hash collisions) that is equal to the number of host devices 204 in the datacenter 202.

The method 400 then proceeds to block 408 where the host device address generation system provides the host device addresses for provisioning on the host devices. In an embodiment, at block 408, the host device address generation engine 304 in the host device address generation system 212 may provide the source IP addresses determined at block 406 to not result in hash collisions in a DHCP configuration file that is configured to provide for host device IP address allocation, and may transmit that DHCP configuration file via its communication system 308 and the network 210 to one or more DHCP server devices in the datacenter management system 208. As such, following block 408, the one or more DHCP server devices may perform a variety of DHCP operations to allocate the source IP addresses included in that DHCP configuration file to the host devices 204 in the datacenter 202, and as discussed above the subsequent use of those source IP addresses by the host devices 204 will prevent any hash collisions when hash values are generated by the networking devices 206 for their respective forwarding tables using information in data packets transmitted by those host devices 204.

In another embodiment, at block 408, the host device address generation engine 304 in the host device address generation system 212 may provide the source IP addresses determined at block 406 to not result in hash collisions in a source IP address list, and may transmit that source IP address list via it communication system 308 and the network 210 to a management device in the datacenter management system 210 for use by a network administrator or other user of the datacenter 202. As such, following block 408, the network administrator or other user of the datacenter 202 may manually allocate the source IP addresses included in that source IP address list to the host devices 204 in the datacenter 202, and as discussed above the use of those source IP addresses by the host devices 204 will prevent any hash collisions when hash values are generated by the networking devices 206 for their respective forwarding tables using information in data packets transmitted by those host devices 204. However, while specific examples of the provisioning of the host device addresses to the host devices 204 have been described, one of skill in the art in possession of the present disclosure will appreciate that the source IP addresses determined at block 406 may be provisioned on the host devices 204 in any of a variety of manners that will fall within the scope of the present disclosure as well.

Thus, systems and methods have been described that proactively prevent hash collisions by determining host device addresses that will not result in hash collisions prior to assigning those host device addresses to host devices, and then subsequently assigning only those host device addresses to the host devices. For example, a host device address generation system may retrieve network addressing information associated with the host devices such as an Internet Protocol (IP) address base that will be utilized by each of the host devices, and at least one subnet mask that will be utilized by each of the host devise. The host device address generation system may then identify a hashing function utilized by networking devices in transmitting data packets associated with the host devices, and use the hashing function and the network addressing information to determine a plurality of host device addresses that do not produce hash collisions. The host device address generation system may then provide the plurality of host device addresses for provisioning to the host devices, which ensures that the networking devices will not generate hash values from data packets received from the host devices that result in hash collisions with other hash values in their forwarding tables that are associated with forwarding information that is utilized to forward data packets associated with the host devices.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A hash collision prevention system, comprising:
a plurality of host devices;
a plurality of networking devices; and
a host device address generation system that is configured to:
retrieve network addressing information associated with the plurality of host devices;
identify a hashing function utilized by the plurality of networking devices in transmitting data packets associated with the plurality of host devices;
determine, using the hashing function and the network addressing information, a plurality of host device addresses that do not produce a hash collision and at least one host device address that does produce a hash collision; and
provide the plurality of host device addresses that do not produce the hash collision for provisioning to the plurality of host devices, while not providing the at least one host device address that does produce a hash collision for provisioning to the plurality of host devices.

2. The system of claim 1, wherein the network addressing information includes an Internet Protocol (IP) address base and at least one subnet mask.

3. The system of claim 1, wherein the host device address generation system is configured to:
identify a number of the plurality of host devices, wherein the plurality of host device identification addresses that do not produce a hash collision are determined using the number of the plurality of host devices.

4. A hash collision prevention system, comprising:
a plurality of host devices;
a plurality of networking devices; and
a host device address generation system that is configured to:
retrieve network addressing information associated with the plurality of host devices;
identify a hashing function utilized by the plurality of networking devices in transmitting data packets associated with the plurality of host devices;
determine, using the hashing function and the network addressing information, a plurality of host device addresses that do not produce a hash collision; and
generate a host device address configuration file that includes the plurality of host device addresses.

5. The system of claim 4, wherein the host device address configuration file is a Dynamic Host Configuration Protocol (DHCP) configuration file, and wherein the host device address generation system is configured to:
provide the DHCP configuration file that includes the plurality of host device addresses to at least one DHCP server device.

6. The system of claim 1, wherein the plurality of host device addresses include Internet Protocol (IP) version 4 (IPv4) addresses and IP version 6 (IPv6) addresses.

7. An Information Handling System (IHS), comprising:
a processing system; and
a memory system that is coupled to the processing system and that includes instructions that, when executed by the processing system, cause the processing system to provide a host device address generation engine that is configured to:
retrieve network addressing information utilized by a plurality of host devices;
identify a hashing function utilized by a plurality of networking devices in transmitting data packets associated with the plurality of host devices;
determine, using the hashing function and the network addressing information, a plurality of host device addresses that do not produce a hash collision and at least one host device address that does produce a hash collision; and
provide the plurality of host device addresses that do not produce the hash collision for provisioning to the plurality of host devices, while not providing the at least one host device address that does produce a hash collision for provisioning to the plurality of host devices.

8. The IHS of claim 7, wherein the network addressing information includes an Internet Protocol (IP) address base and at least one subnet mask.

9. The IHS of claim 7, wherein the host device address generation engine is configured to:
identify a number of the plurality of host devices, wherein the plurality of host device addresses that do not produce a hash collision are determined using the number of the plurality of host devices.

10. The IHS of claim 7, wherein the plurality of host device addresses include Internet Protocol (IP) version 4 (IPv4) addresses and IP version 6 (IPv6) addresses.

11. The IHS of claim 7, the host device address generation engine is configured to:
determine at least one configuration detail for at least one of the plurality of networking devices; and
provide the at least one configuration detail for provisioning on the at least one of the plurality of networking devices.

12. An Information Handling System (IHS), comprising:
a processing system; and
a memory system that is coupled to the processing system and that includes instructions that, when executed by the processing system, cause the processing system to provide a host device address generation engine that is configured to:
retrieve network addressing information utilized by a plurality of host devices;
identify a hashing function utilized by a plurality of networking devices in transmitting data packets associated with the plurality of host devices;
determine, using the hashing function and the network addressing information, a plurality of host device addresses that do not produce a hash collision; and
generating a host device address configuration file that includes the plurality of host device addresses.

13. The IHS of claim 12, wherein the host device address configuration file is a Dynamic Host Configuration Protocol (DHCP) configuration file, and wherein the host device address generation engine is configured to:
provide the DHCP configuration file that includes the plurality of host device addresses to at least one DHCP server device.

14. A method for preventing hash collisions, comprising:
retrieving, by a host device address generation system, network addressing information utilized by a plurality of host devices;
identifying, by the host device address generation system, a hashing function utilized by a plurality of networking devices in transmitting data packets associated with the plurality of host devices;
determining, by the host device address generation system using the hashing function and the network addressing information, a plurality of host device addresses that do not produce a hash collision and at least one host device address that does produce a hash collision; and
providing, by the host device address generation system, the plurality of host device addresses that do not produce the hash collision for provisioning to the plurality of host devices, while not providing the at least one host device address that does produce a hash collision for provisioning to the plurality of host devices.

15. The method of claim 14, wherein the network addressing information includes an Internet Protocol (IP) address base and at least one subnet mask.

16. The method of claim 15, further comprising:
identifying, by the host device address generation system, a number of the plurality of host devices, wherein the plurality of host device addresses that do not produce a hash collision are determined using the number of the plurality of host devices.

17. The method of claim 14, wherein the plurality of host device addresses include Internet Protocol (IP) version 4 (IPv4) addresses and IP version 6 (IPv6) addresses.

18. The method of claim 14, further comprising:
determining, by the host device address generation system, at least one configuration detail for at least one of the plurality of networking devices; and
providing, by the host device address generation system, the at least one configuration detail for provisioning on the at least one of the plurality of networking devices.

19. A method for preventing hash collisions, comprising:
retrieving, by a host device address generation system, network addressing information utilized by a plurality of host devices;
identifying, by the host device address generation system, a hashing function utilized by a plurality of networking devices in transmitting data packets associated with the plurality of host devices;
determining, by the host device address generation system using the hashing function and the network addressing information, a plurality of host device addresses that do not produce a hash collision; and
generating, by the host device address generation system, a host device address configuration file that includes the plurality of host device addresses.

20. The method of claim 19, wherein the host device address configuration file is a Dynamic Host Configuration Protocol (DHCP) configuration file, and wherein the method further comprises:
providing, by the host device address generation system, the DHCP configuration file that includes the plurality of host device addresses to at least one DHCP server device.

* * * * *